United States Patent [19]

Takahata et al.

[11] Patent Number: 5,259,205
[45] Date of Patent: Nov. 9, 1993

[54] ELEMENT FOR ABSORPTION CHILLIER/ABSORPTION CHILLER-HEATER, AND ABSORPTION CHILLER/ABSORPTION CHILLER-HEATER COMPRISING THE ELEMENTS

[75] Inventors: Shuzo Takahata; Kunihiko Nakajima, both of Ootsushi; Osamu Ooishi, Kusatsushi; Tomiyasu Okita, Amagasakishi, all of Japan

[73] Assignee: Kawasaki Thermal Engineering Co., Ltd., Kusatsushi, Japan

[21] Appl. No.: 891,056

[22] Filed: Jun. 1, 1992

[30] Foreign Application Priority Data

Jun. 18, 1991 [JP] Japan .................................. 3-174331

[51] Int. Cl.⁵ ............................................. F25B 15/00
[52] U.S. Cl. ......................................... 62/476; 62/475; 62/148
[58] Field of Search ................. 62/476, 101, 475, 103, 62/104, 483, 148

[56] References Cited

U.S. PATENT DOCUMENTS

| | | | |
|---|---|---|---|
| 3,122,002 | 2/1964 | Miner et al. | 62/476 |
| 3,357,202 | 12/1967 | Holman et al. | 62/476 |
| 3,517,522 | 6/1970 | Ozono et al. | 62/476 |
| 3,605,436 | 9/1971 | Gammill | 62/476 |
| 3,964,273 | 6/1976 | Merrick | 62/476 |
| 5,007,251 | 4/1991 | Thuez et al. | 62/476 |

Primary Examiner—Albert J. Makay
Assistant Examiner—William C. Doerrler
Attorney, Agent, or Firm—Jones, Tullar & Cooper

[57] ABSTRACT

In a box-shaped main body of a nearly rectangular parallelepiped shaped shell, an absorber, an evaporator, a low temperature regenerator, and a condenser are disposed sequentially in the vertical direction from the bottom, and a refrigerant sump of nearly V or U shape is disposed between the evaporator and absorber. Furthermore, an eliminator is disposed in an oblique direction at the side of the evaporator, and a purging enclosing member is disposed in the absorber, and a flush chamber of double structure is installed between the evaporator and refrigerant sump. This slim low temperature shell, and high temperature regenerator and others are formed into one body forming an element or module, and a plurality of elements are disposed parallel in the lateral direction, or disposed in the lateral direction and stacked up in the vertical direction, thereby forming a large-sized absorption chiller/absorption chiller-heater. In this construction, the machine width of the elements or modules for absorption chiller/absorption chiller-heater (combined structures of low temperature shell, high temperature regenerator, and other constituent parts) may be notably reduced to be slim and compact, and the elements can be easily transported as one body without being divided. By disposing a plurality of elements parallel in the lateral direction, or disposing them in the lateral direction and stacked in the vertical direction, the capacity may be easily enlarged.

30 Claims, 15 Drawing Sheets

ELEMENT FOR ABSORPTION CHILLIER/ABSORPTION CHILLER-HEATER, AND ABSORPTION CHILLER/ABSORPTION CHILLER-HEATER COMPRISING THE ELEMENTS

BACKGROUND OF THE INVENTION

The present invention relates to an element or a module for an absorption chiller/absorption chiller-heater (having a low temperature shell and a high temperature regenerator or the like formed in one body), and an absorption chiller/absorption chiller-heater comprising a plurality of the elements. More particularly, the invention relates to an element for an absorption chiller/absorption chiller-heater, and an absorption chiller/absorption chiller-heater comprising the elements, being made slim and compact by greatly reducing the machine width of the elements, so that it is easy to transport without dividing the element, and easy to enlarge in scale by supplying a plurality of elements parallel in the lateral direction, or supplying them in the lateral direction and stacking them in the vertical direction.

Hitherto an absorption chiller-heater is generally known which uses, for example, lithium bromide as an absorbent, and, for example, water as a refrigerant.

A conventional absorption chiller-heater is composed, for example, as shown in FIG. 1. Numeral 1 denotes an upper low temperature shell, comprising a low temperature regenerator 2 and a condenser 3. A refrigerant sump 4 is installed in the lower part in the condenser 3. Numeral 5 denotes a lower low temperature shell, comprising an evaporator 6 and an absorber 7. Numeral 8 is a high temperature regenerator, comprising a combustion chamber 9, heat recovery unit 10, gas-liquid separator 11, exhaust tube 12 and combustion unit 13. Other constituent devices include a low temperature heat exchanger 14 and a high temperature heat exchanger 15.

A weak solution in a liquid sump 16 in the lower part of the absorber 7 is sent by a low temperature pump 17 to the low temperature regenerator 2 through ducts 18, 19, low temperature heat exchanger 14 and duct 20. This weak solution is heated by the high temperature refrigerant vapor flowing in from the duct 21, and is concentrated to a middle solution.

The middle solution is divided in two portions. One of the two portions of the solution is sent to the high temperature regenerator 8 by a high temperature pump 22 through ducts 23, 24, high temperature heat exchanger 15 and duct 25. This middle solution is heated by the combustion unit 13, and moves up in the heat recovery unit 10 and enters the gas-liquid separator 11 to be separated into the refrigerant vapor and strong solution. The strong solution is mixed with the middle solution (the other one of the two portions of the solution) from the duct 28 divided first through strong solution duct 26, high temperature heat exchanger 15 and duct 27, by the differential pressure of about 650 mmHg of the pressure in the high temperature regenerator 8 and the pressure of about 6 mmHg in the lower low temperature shell 5, and the mixed strong solution enters the low temperature heat exchanger 14, and passes through a duct 29. The mixed strong solution is sprayed over the heating tubes (heat transfer tubes) of the absorber 7 by a sprinkler (sprayer) 30, and then returns to the liquid sump 16 in a circulating loop.

On the other hand, the refrigerant vapor separated in the gas-liquid separator 11 enters the low temperature regenerator 2 through the duct 21, and heats the solution, and condenses and liquefies, and gets into the condenser 3 through a duct 46. In the low temperature regenerator 2, the refrigerant vapor generated when the weak solution is concentrated to a middle solution gets into the condenser 3 from the upper space and is condensed to a liquid refrigerant. The condensed refrigerant gets into the evaporator 6 through a duct 31, and is collected in the lower sump 32. The refrigerant is sprayed over the heating tubes of the evaporator 6 by the sprinkler 36 through ducts 34, 35.

Chilled water presented for air cooling (air conditioning) enters the evaporator 6 from a duct 37, and is cooled by the evaporation latent heat of the dripping refrigerant, and flows out from the duct 38. The cooling water flows out through ducts 39, 40, 41, deprives the absorber 7 of absorption heat and the condenser 3 of condensation heat on the way and is brought out of the system.

Besides, by opening the chiller-heater changeover valve 60 and stopping the cooling water supplied to the duct 39, warm water (hot water) can be obtained from the duct 38.

Thus, in the conventional absorption chiller or absorption chiller-heater, inside the cylindrical lower low temperature shell 5, the evaporator 6 and absorber 7 are disposed in the lateral direction, while the condenser 3 and low temperature regenerator 2 are disposed in the upper low temperature shell 1 which is separate from the lower low temperature shell 5.

Accordingly, the machine width is large, and in the case of large-capacity machines, especially, when transporting them on a trailer or the like, it was necessary to divide the low temperature shell and high temperature regenerator 8, and separate into the lower low temperature shell 5 and upper low temperature shell 1. The low temperature shells (upper+lower) and high temperature regenerator, and the lower low temperature shell 5 and upper low temperature shell 1 are connected with each other by vacuum piping, and it was necessary to cut them separately for transport, reassemble them at the site, weld, and check them by vacuum test, all of which are required tremendous cost in cutting, welding, transportation of vacuum test apparatus, and performance of vacuum test. Besides, because of the large machine width, it was difficult to deliver it into the machine room in the field.

Since the machine was huge in the prior art as described herein, especially in the case of a large-capacity machine, it was necessary to separate it into the low temperature shells (upper+lower) and high temperature regenerator, or, as the case may be, into the upper low temperature shell, lower low temperature shell, and high temperature regenerator.

OBJECT AND SUMMARY OF THE INVENTION

It is hence a primary object of the present invention to provide an element for an absorption chiller/absorption chiller-heater, and an absorption chiller/absorption chiller-heater comprising the elements, wherein absorber, evaporator, low temperature regenerator, and condenser are stored in the longitudinal direction in a box body of nearly rectangular parallelepiped shape so as to make use of the space in the body effectively, the shape of the refrigerant sump between the evaporator and absorber is designed specifically for ease of flow of the refrigerant vapor, thereby resulting in a low temperature shell shortened in the main body width, and the low temperature shell, high temperature regenerator and others are incorporated into one element so as to be transported on a trailer without having to divide or separate the main body, and to be delivered into a machine room easily. A plurality of elements can be installed laterally and parallel in the field, or in the lateral direction and stacked in the vertical direction so that the scale of the machine may be easily enlarged.

To achieve the above object, the invention provides an element for absorption chiller/absorption chiller-heater comprising a low temperature shell composed of an absorber disposed in the bottom of a box-shaped main body in a nearly rectangular parallelepiped, an evaporator disposed at the upper side of the absorber, a low temperature regenerator and a condenser disposed at the upper side of the evaporator through a partition plate, and a refrigerant sump of nearly V or U shape disposed between the evaporator and absorber so that the refrigerant vapor evaporated in the evaporator tube may flow smoothly into the absorber, wherein the low temperature shell and other constituent members such as high temperature regenerator and others are formed into one body. The other constituent members include high temperature regenerator, low temperature heat exchanger, high temperature heat exchanger, and others.

In the element for the absorption chiller/absorption chiller-heater, an eliminator is disposed in an oblique direction at a side part of the evaporator in order to form a passage of refrigerant vapor evaporated in the evaporator tube narrows as it proceeds upward.

Also in the element for the absorption chiller/absorption chiller-heater, the eliminator is composed of multiple slant plates, folded-back parts bent upward, communicating with the upper end of the slant plates, and straightening parts curved downward, communicating with the upper end of the slant plates. By the straightening parts, the refrigerant vapor may be allowed to flow smoothly downward toward the absorber.

Also in the element of the invention, an enclosing member with the upper end closed is disposed in a part in the absorber in order to collect the uncondensed gas in the absorber in one position, a space of lower pressure is formed, and a purge pipe is connected to this space.

Furthermore in the element of the invention, a flush box composed of an inner tube and an outer box having multiple tiny holes extending in the longitudinal direction of the inner tube and outer box and notches extending in the outer box are disposed between the evaporator and refrigerant sump over the entire length of the evaporator, and condensed liquid refrigerant is passed in the inner tube, and a flush chamber is formed between the outer box and the inner tube.

The absorption chiller/absorption chiller-heater of the invention is composed by disposing a plurality of the above elements for absorption chiller/absorption chiller-heater parallel in the lateral direction.

The element (module) of the invention is composed of a low temperature shell composed of a box-shaped main body nearly in rectangular parallelepiped shape of narrow width, and other constituent members such as a high temperature regenerator, and therefore it can be transported as one body without dividing or cutting the vacuum part as in the prior art. It is also easy to deliver the assembly into the machine room at the installation site, and by disposing a plurality of elements in parallel in the lateral direction in one room, the capacity may be easily increased.

A plurality of elements for absorption chiller/absorption chiller-heater are arranged in the lateral direction, and installed by stacking them in the vertical direction, or aligned in height and length, and varied only in width depending on capacity.

Furthermore, cold and hot water inlet, cold and hot water outlet, cooling water inlet, and cooling water outlet are gathered in the rear panel or upper panel of the main body, or a plurality of elements are entirely enclosed with a decorative cover to look like one machine in appearance, or a temperature sensor may be installed at the cold and hot water outlet to detect the temperature of the cold and hot water after collecting the cold and hot water from elements, thereby controlling the amount of fuel supplied to each element.

DETAILED DESCRIPTION OF THE PREFERRED EMBODIMENTS

Figure 1:
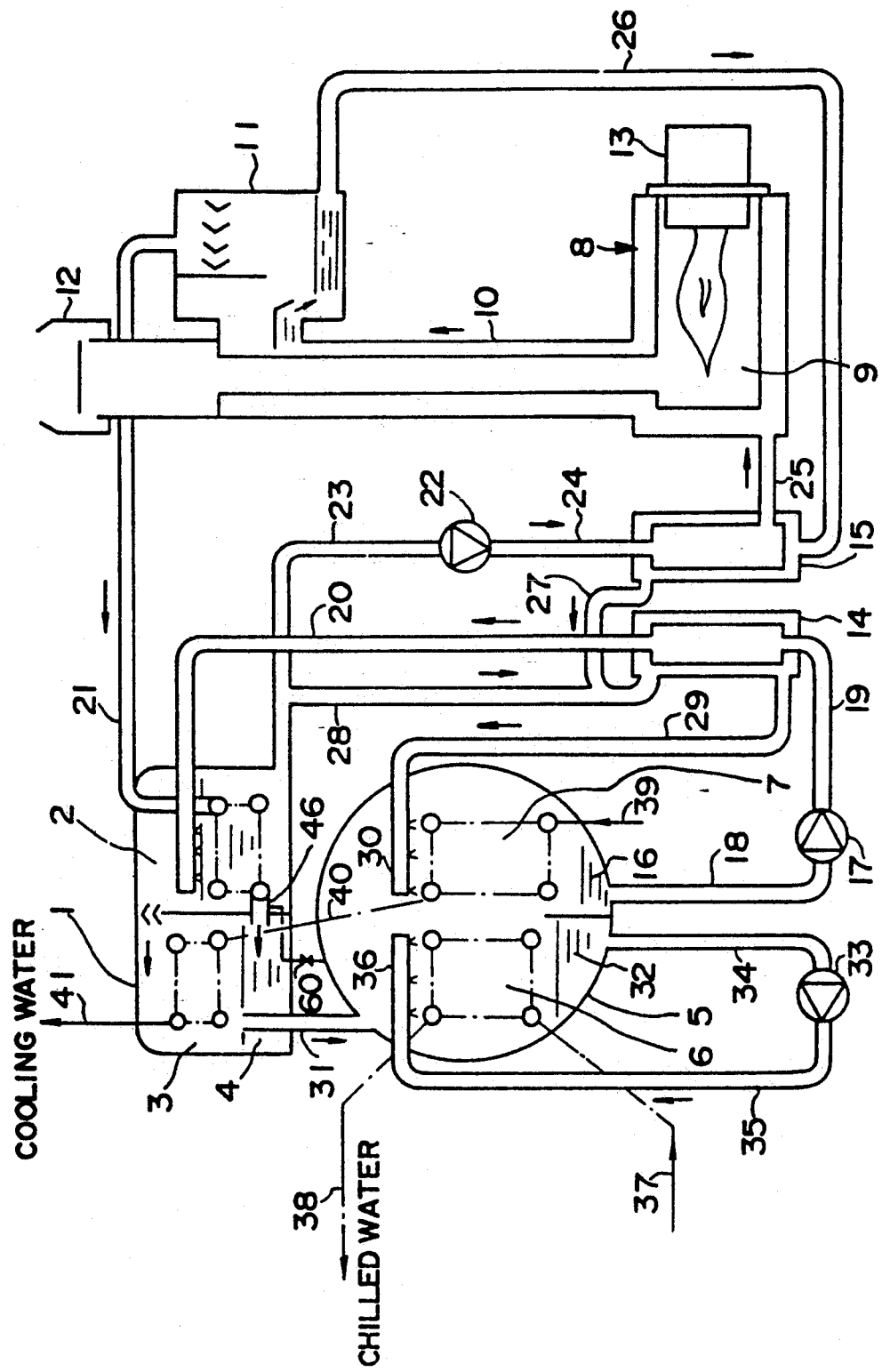
FIG. 1 is an explanatory diagram showing the flow of a conventional absorption chiller-heater.

Referring now to the drawings, some of the preferred embodiments of the invention are described in detail below.

An element for absorption chiller/absorption chiller-heater of the invention comprise, as shown in the drawings, a low temperature shell composed of an absorber 52 disposed in the bottom of a box shaped main body 51 in a nearly rectangular parallelepiped. An evaporator 53 is disposed at the upper side of the absorber 52, a low temperature regenerator 54 and a condenser 55 are disposed at the upper side of the evaporator 53 through a partition plate 56, and a refrigerant sump 57 of nearly V or U shaped is disposed between the evaporator 53 and the absorber 52 so that the refrigerant vapor evaporated in the evaporator tube may flow smoothly into the absorber 52, wherein the low temperature shell and other constituent members such as high temperature regenerator and others are formed into one body. The other constituent members include a high temperature regenerator, a low temperature heat exchanger, a high temperature heat exchanger, and others.

In the element for absorption chiller/absorption chiller-heater an eliminator 66 is disposed in an oblique direction at the side part of the evaporator 53 in order to form a passage 69 of refrigerant vapor evaporated in the evaporator tube which narrows as it goes upward.

Figure 4:
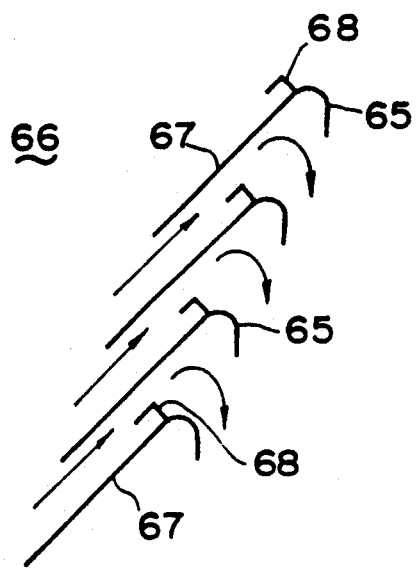
FIG. 4 is a magnified explanatory view showing details of the eliminator shown in FIG. 2.

In the element for absorption chiller/absorption chiller-heater, the eliminator 66 is composed of multiple slant plates 67, folded-back parts 68 bent upward, communicating with the upper end of the slant plates, and straightening parts 65 curved downward, communicating with the upper end of the slant plates (FIG. 4). By the straightening parts, the refrigerant vapor may be smoothly allowed to flow downward toward the absorber.

In the element an enclosing member 70 with its upper end closed is disposed in a part in the absorber 52 in order to collect the uncondensed gas in the absorber in one position, and a space 71 of lower pressure is formed, with a purge pipe 72 connected to this space.

In the element a flush box 77 composed of an inner tube 73 and an outer box 74 having multiple tiny holes 75, 76 extending in the longitudinal direction of the inner tube 73 and outer box 74 and notches 76' extending in the outer box 74 are disposed between the evaporator 53 and refrigerant sump 57 over the entire length of the evaporator. Condensed liquid refrigerant is passed in the inner tube 73, and a flush chamber 78 is formed between the outer box 74 and inner tube 73.

The absorption chiller/absorption chiller-heater of the invention is composed by disposing a plurality of the above elements 49 for absorption chiller/absorption chiller-heater parallel in the lateral direction.

Figure 11:
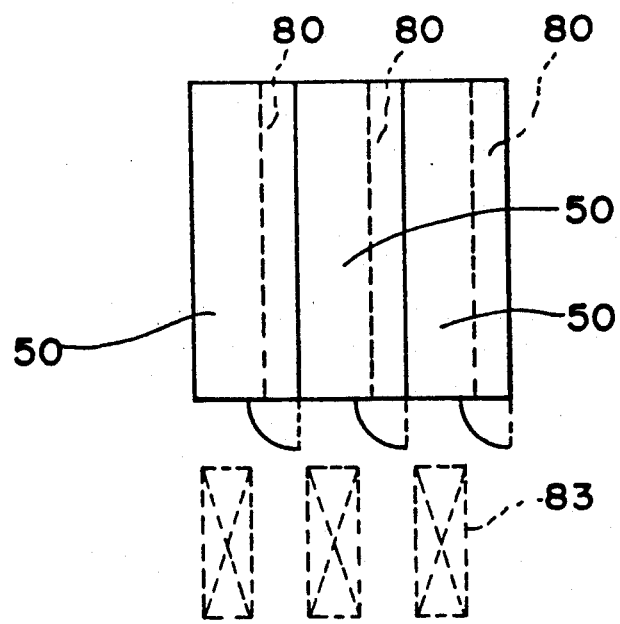
FIG. 11 is an elevation showing the elements of the invention disposed in the parallel state in the lateral direction.

The element (module) of the invention is composed of a low temperature shell 50 composed of a box-shaped main body nearly as a rectangular parallelepiped of narrow width, and other constituent members such as a high temperature regenerator, and therefore it can be transported as one body without dividing or cutting the vacuum part as in the prior art. It is also easy to deliver into the machine room at the installation site, and, as shown in FIG. 11, by disposing a plurality in parallel in the lateral direction in one room, the capacity may be easily increased.

A plurality of elements 49 for absorption chiller/absorption chiller-heater are arranged in the lateral direction, and installed by stacking in the vertical direction, or aligned in height and length, and varied only in width depending on capacity.

Furthermore, cold and hot water inlet 86, cold and hot water outlet 87, cooling water inlet 89, and cooling water outlet 85 are assembled in the rear panel or upper panel of the main body 51, or a plurality of elements are entirely enclosed with a decorative cover 91 to look like one machine in appearance. A temperature sensor 93 may be installed at the cold and hot water outlet 87 to detect the temperature of the cold and hot water after collecting the cold and hot water from the elements, thereby controlling the amount of fuel supplied to each element.

Figure 2:
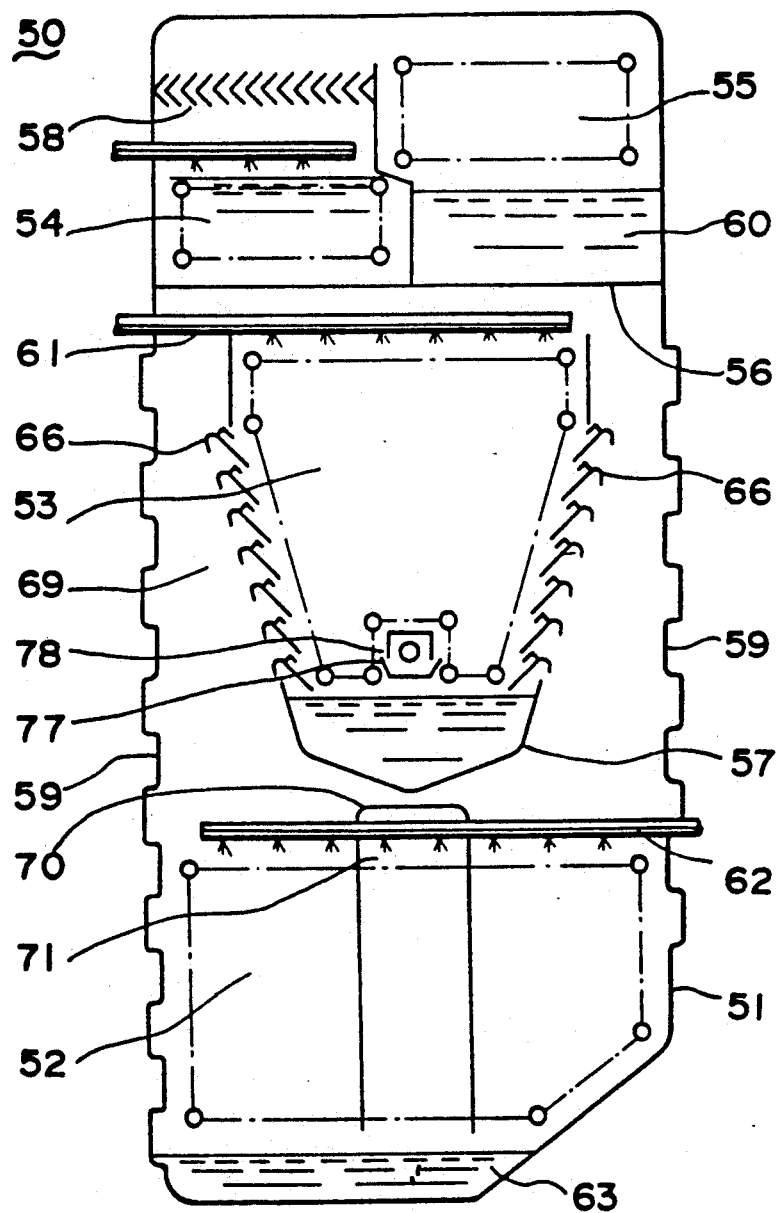
FIG. 2 is a sectional view showing an embodiment of a low temperature shell which is an essential part of the absorption chiller/absorption chiller-heater of the invention.
Figure 3:
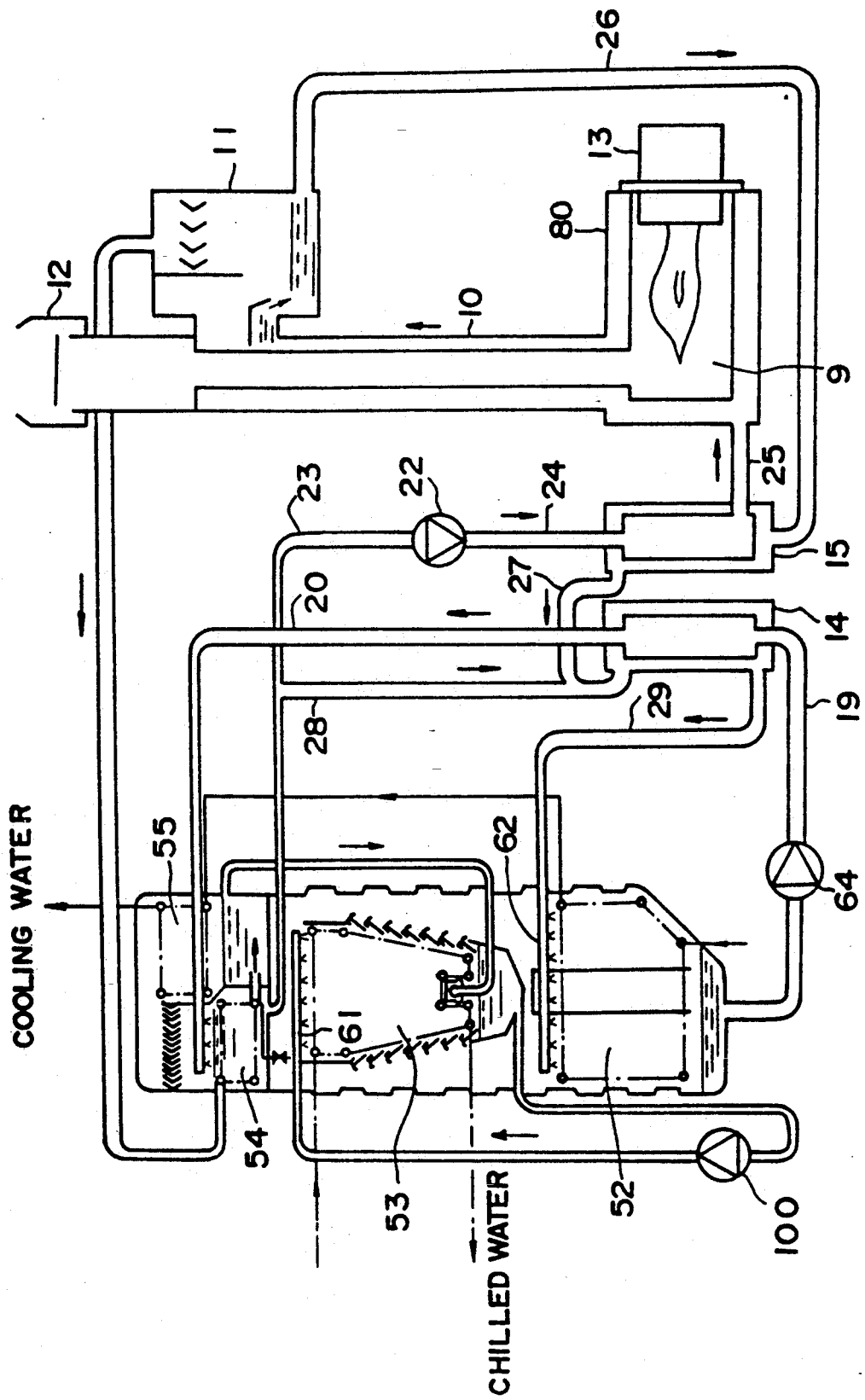
FIG. 3 is an explanatory diagram showing the flow around the low temperature shell as an essential part of the element shown in FIG. 2.

FIG. 2 shows a cross section of a low temperature shell 50 which is an essential part of an element (module) for absorption chiller/absorption chiller-heater of the invention, and FIG. 3 shows the details around the low temperature shell 50 as an essential part of the element. Numeral 51 is the box-shaped main body in a nearly rectangular parallelepiped, with the absorber 52 disposed in the bottom of this main body 51, and the evaporator 53 disposed at the upper side of the absorber 52. At the upper side of the evaporator 53, the low temperature regenerator 54 and the condenser 55 are disposed through the partition plate 56. Between the evaporator 53 and the absorber 52, the refrigerant sump 57 of a nearly V-shape is disposed. This refrigerant sump may be also formed in a nearly U-shape.

The part of the wall which is subject to a high degree of vacuum in the main body 51 is reinforced by forming undulations 59 in the wall surface. Accordingly, the wall thickness may be as thin as that of a conventional cylindrical type. The undulations 59 may also be disposed in the longitudinal direction of the main body, or may be formed in spots. Numeral 58 refers to a baffle plate, 60 to a refrigerant sump, 61 to a refrigerant sprinkling pipe, 62 to an absorption solution sprinkling pipe, 63 to an absorption solution sump, 64 to a low temperature pump, and 100 to a refrigerant pump.

The refrigerant vapor evaporating in contact with the heating tube of the evaporator 53 is lowered, and flows from the side of the V-shaped refrigerant sump 57 toward the bottom, and flows smoothly into the absorber 52.

Thus, in the box-shaped main body 51, the absorber 52, evaporator 53, low temperature regenerator 54 and condenser 55 are disposed sequentially from the bottom, and the refrigerant sump 57 is formed nearly in V-shape or U-shape, so that the space in the main body 51 may be effectively utilized, and the width W of the main body 51 may be significantly reduced from the conventional cylindrical type.

At the side of the evaporator 53, the eliminator 66 as shown in FIG. 2 to FIG. 4 is disposed in an oblique direction so that the passage 69 of the refrigerant vapor path may become narrower as it proceeds upward. The eliminator 66 is composed of the multiple slant plates 67, the folded-back part 68 bent upward, communicating with the upper end of the slant plates, and the straightening part 65 curved downward, communicating with the upper end of the slant plates (FIG. 4), and the refrigerant vapor evaporated in contact with the heating tubes of the evaporator 53 flows in the direction of the arrows shown in FIG. 4. The liquid drops are stopped in the folded-back part 68 to allow downward flow along the slant plates 67, and the refrigerant vapor is smoothly passed downward through the straightening part 65 (toward the absorber). The folded-back part 68 is shown in a pointed shape, but it may be formed in curvature.

Figure 5:
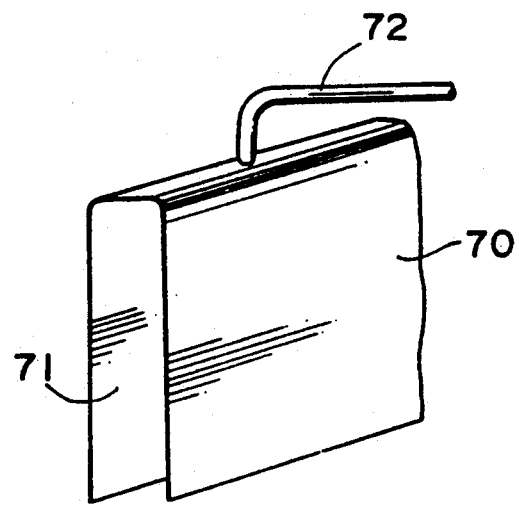
FIG. 5 is a perspective view showing an enclosing member for purging purposes shown in FIG. 2.

In a part of the absorber 52, for example, in the middle, as shown in FIG. 2, FIG. 3 and FIG. 5, the enclosing member 70 with the closed upper end is disposed to form the space 71 which is much lower in pressure, and the purge pipe 72 is connected to this space 71. Thus, the uncondensed gas in the absorber 52 may be efficiently collected in one position, and discharged.

Figure 6:
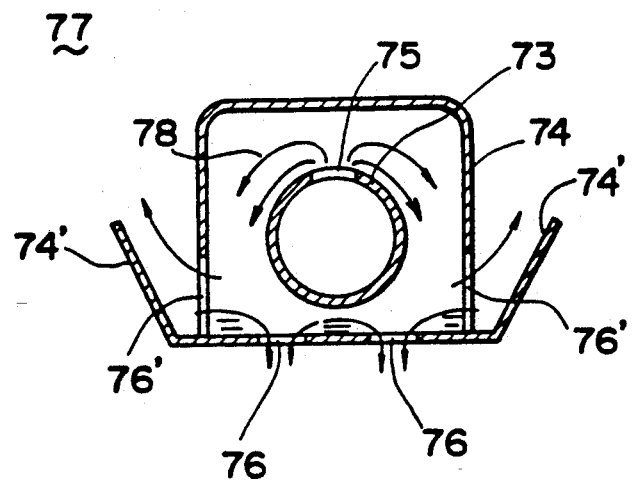
FIG. 6 is a magnified sectional view showing an example of the flush box shown in FIG. 2.

Furthermore, between the evaporator 53 and refrigerant sump 57, as shown in FIGS. 2, 3 and 6, there is the flush box 77 consisting of the inner tube 73 and the outer box 74, having a plurality of the tiny holes 75, 76 extending in the longitudinal direction of the inner tube 73 and outer box 74, with the notch 76' extending in the outer box 74. It is desirable to have the tiny holes 75 of the inner tube 73 and the tiny holes 76 of the outer box 74 deviated in position, for example, the tiny holes 75 in the upper part of the inner tube 73 and the tiny holes 76 in the lower part of the outer box 74. Furthermore, at both sides of the bottom of the outer box 74, there are guide members 74' directed obliquely upward. The condensed refrigerant from the condenser is passed into the inner tube 73, and spouted into the flush chamber 78 between the outer box 74 and inner tube 73 through the tiny holes 75 to be separated into refrigerant vapor and refrigerant. After separation, the refrigerant vapor and refrigerant are passed downward, and the refrigerant vapor is discharged through the notch 76', while the refrigerant liquid flows out from the tiny holes 76 in the outer box 74 in the lower part.

In the conventional absorption chiller-heater shown in FIG. 1, the condensed refrigerant led into the evaporator 6 from the condenser 3 is flushed in the evaporator 6. In order to slow down the flow velocity of the refrigerant vapor in a part of the evaporator 6, it was necessary to have a room of wide section.

As shown in FIG. 6, forming a flush box 77 as a double structure to include a flux chamber 78 between the inner tube 73 and outer box 74, and designing to make use of the overall length of the evaporator 53, the flush box 77 may be formed in a compact sectional shape.

Thus, in addition to the structure shown in FIG. 2, by employing the structure shown in FIGS. 4, 5 and 6, the width W of the low temperature shell 50 of the element may be further reduced, and a slim and compact shape is formed at the same time. Accordingly, if the low temperature shell 50, high temperature regenerator 80 and others are formed in one body, a slim and compact shape is formed on the whole.

Figure 7:
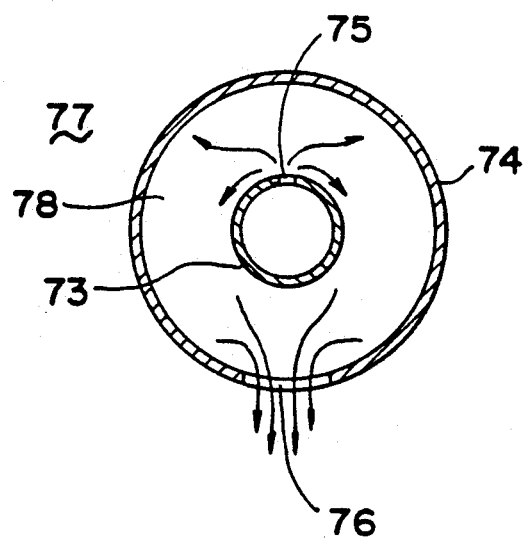
FIG. 7 is a magnified sectional view showing another example of a flush box.

Besides, as shown in FIG. 7, it is also possible to form the flush box 77 as a double tube structure by composing the outer box 74 in a tubular form.

Figure 8:
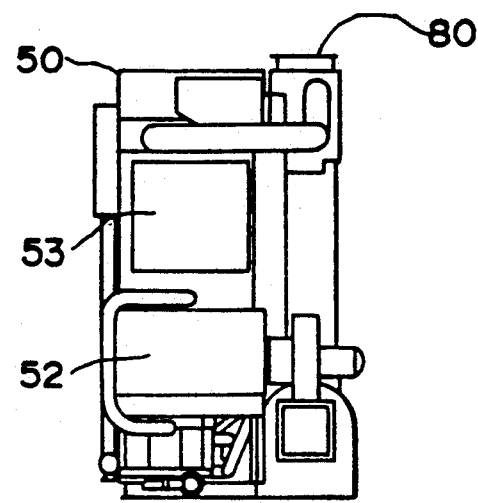
FIG. 8 is a front view showing an example of an element of the invention.
Figure 9:
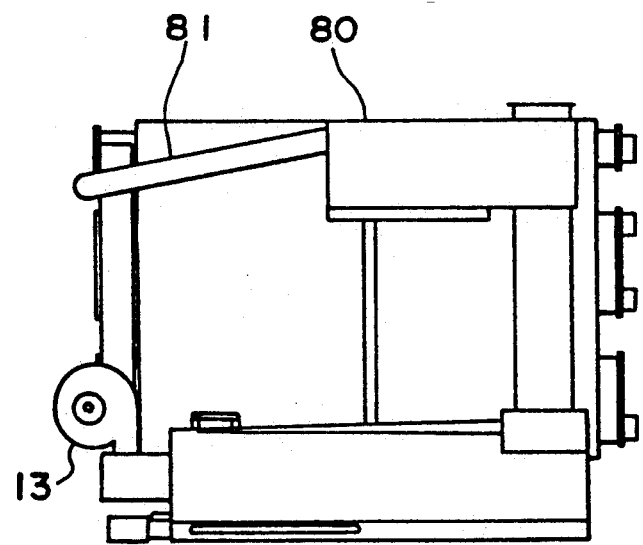
FIG. 9 is a right side view showing an example of an element of the invention.

FIG. 8 and FIG. 9 show examples of composing an element for an absorption chiller-heater by forming the thus composed low temperature shell 50, high temperature regenerator 80 and others into one body. Numeral 81 denotes refrigerant vapor piping.

Figure 10:
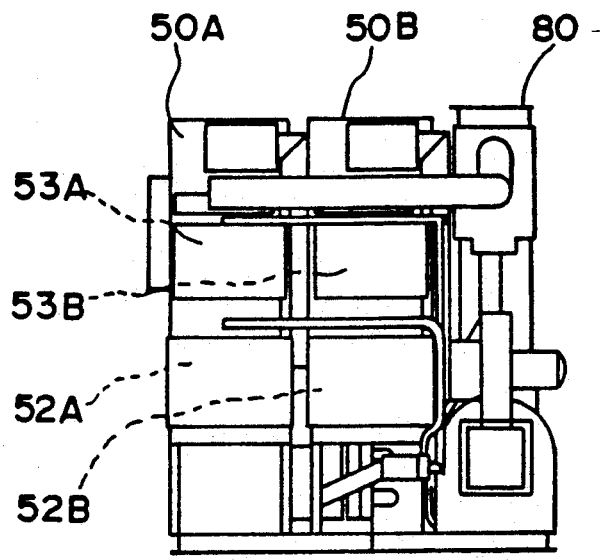
FIG. 10 is a front view showing another example of an element of the invention.

FIG. 10 shows an example of composing an element for an absorption chiller-heater by forming two parallel linked low temperature shells 50A, 50B and a high temperature regenerator 80 and others into one body. Numerals 52A, 52B are absorbers, and 53A, 53B are evaporators.

In this way, the element formed into one body comprising the low temperature shell 50 (or 50A and 50B), high temperature regenerator 80 and others is transported as one body, and is delivered into one machine room as shown in FIG. 11, and installed parallel in the lateral direction, so that the capacity may be easily enhanced. Numeral 83 is a heating pipe draw-out space.

Figure 12:
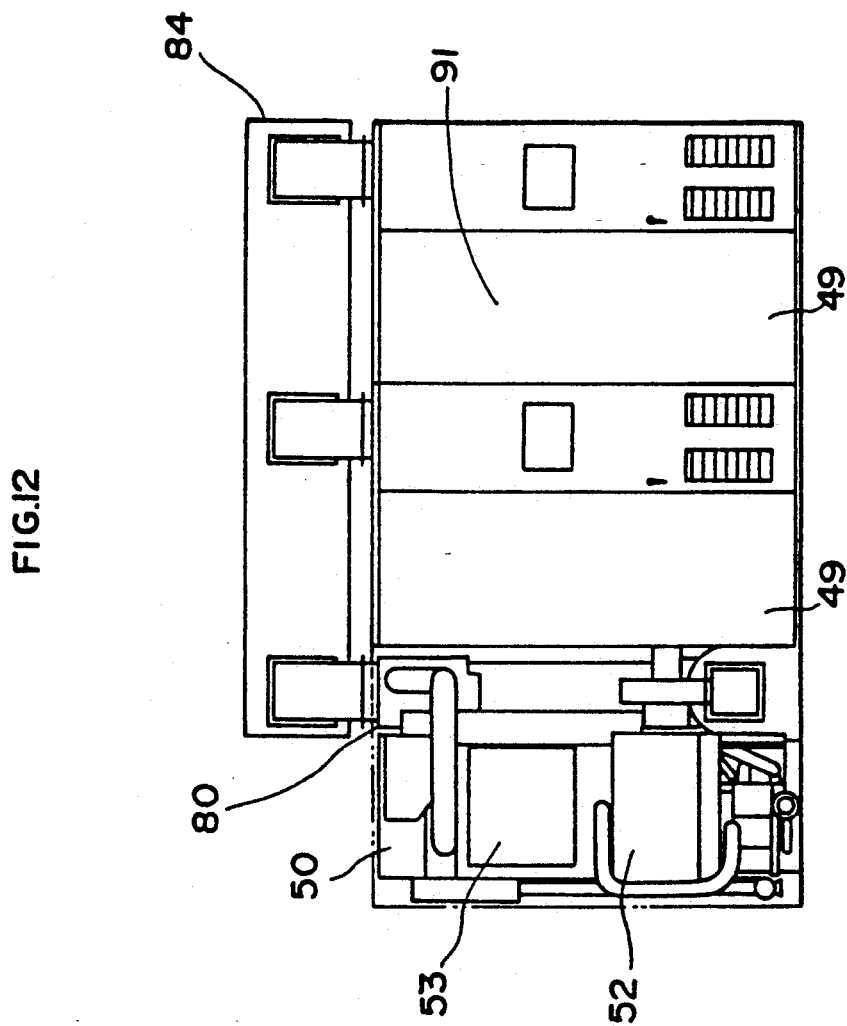
FIG. 12 is a front view of the configuration of FIG. 11.
Figure 13:
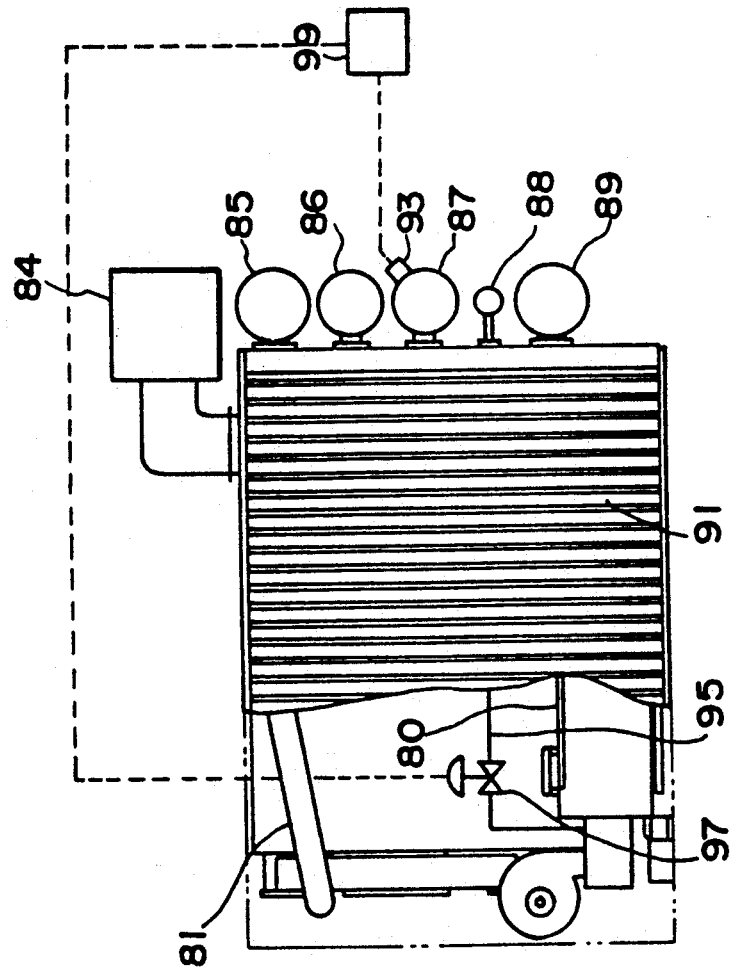
FIG. 13 is a right side view showing an example of the configuration in FIG. 11.

FIG. 12 is a front view of the configuration of FIG. 11, and FIG. 13 shows its right side view. Numeral 84 denotes an exhaust gas outlet, 85 is the cooling water outlet, 86 is the cold and warm (hot) water inlet, 87 is the cold and warm water outlet, 88 is the fuel inlet, and 89 is the cooling water inlet.

Figure 17:
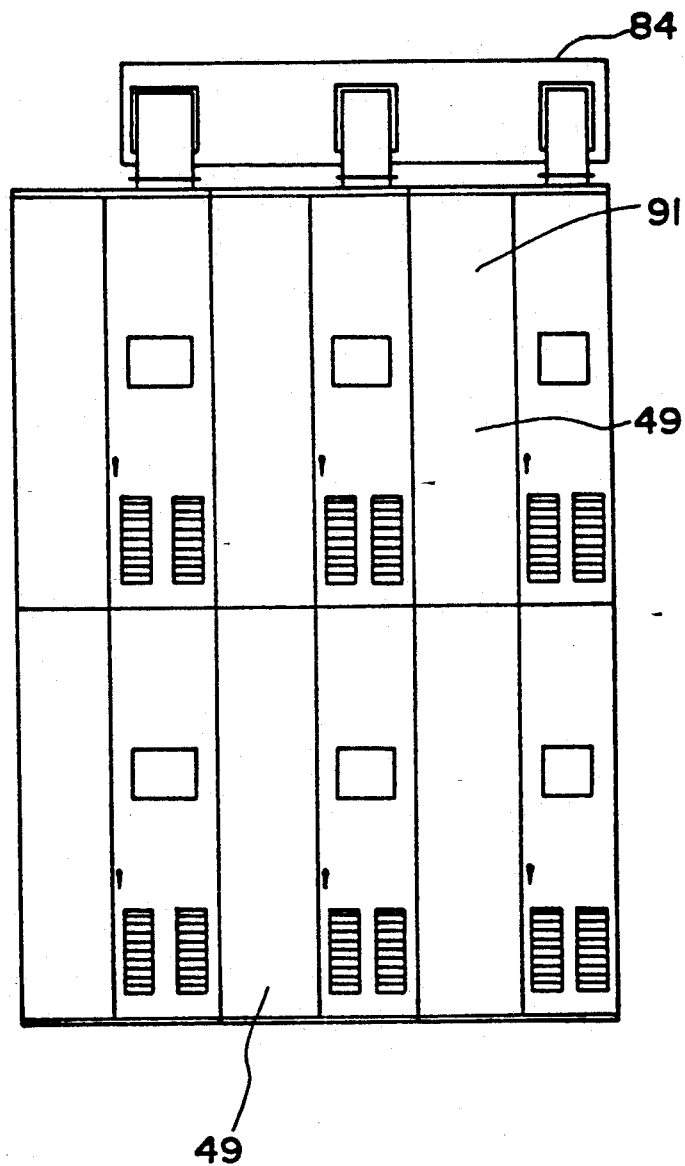
FIG. 17 is a front view showing the elements of the invention in the state of arrangement in the lateral direction, and stacking in the vertical direction.
Figure 18:
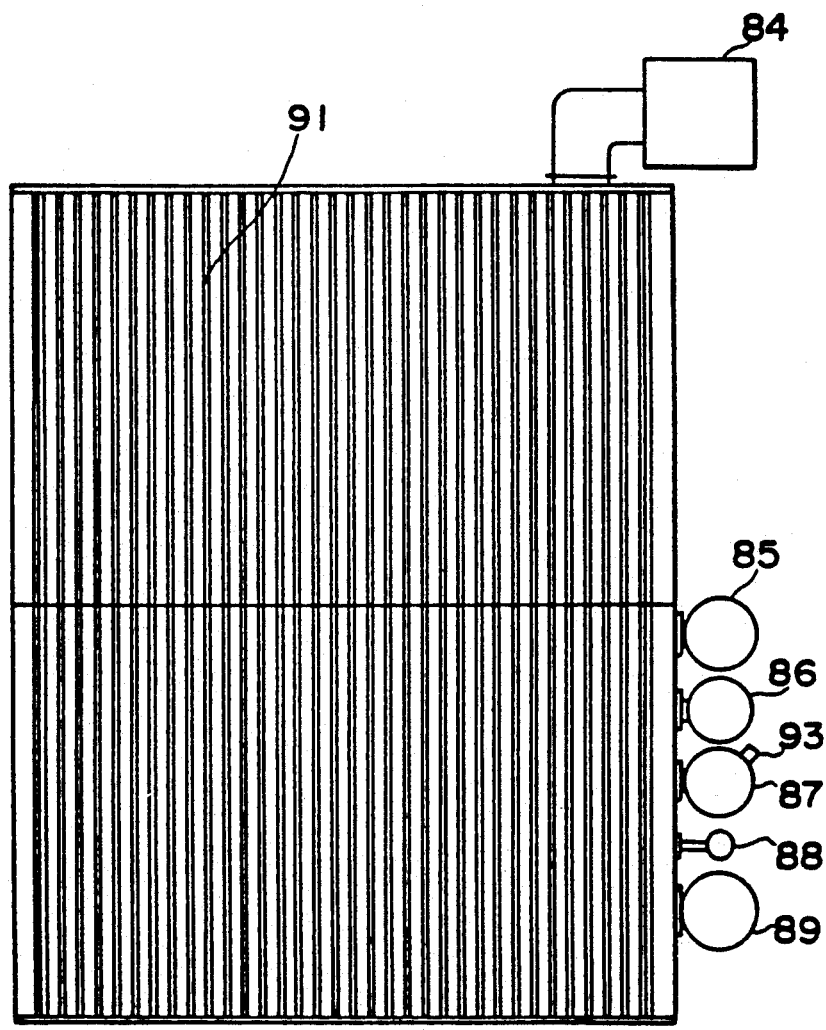
FIG. 18 is a right side view of FIG. 17.

FIG. 17 and FIG. 18 show the method of arranging the elements 49 in the lateral direction and stacking them in the vertical direction. In FIG. 17, as an example, three lateral rows and two vertical stages are shown, which may be properly increased or decreased depending on capacity.

Figure 19:
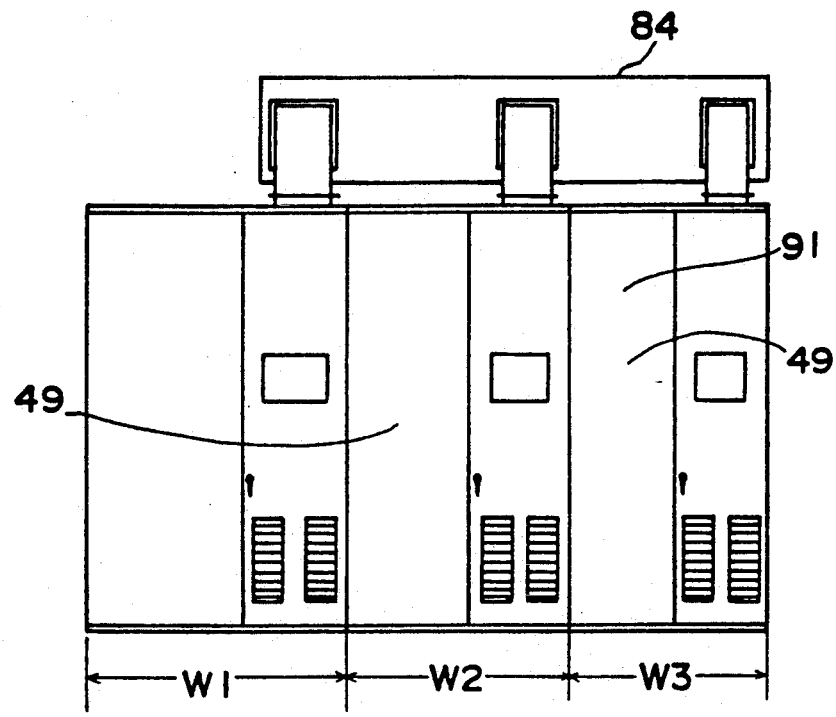
FIG. 19 is a front view showing the elements of the invention in the state of alignment in height and length, varying only the width depending on the capacity, and disposing the elements in the lateral direction.
Figure 20:
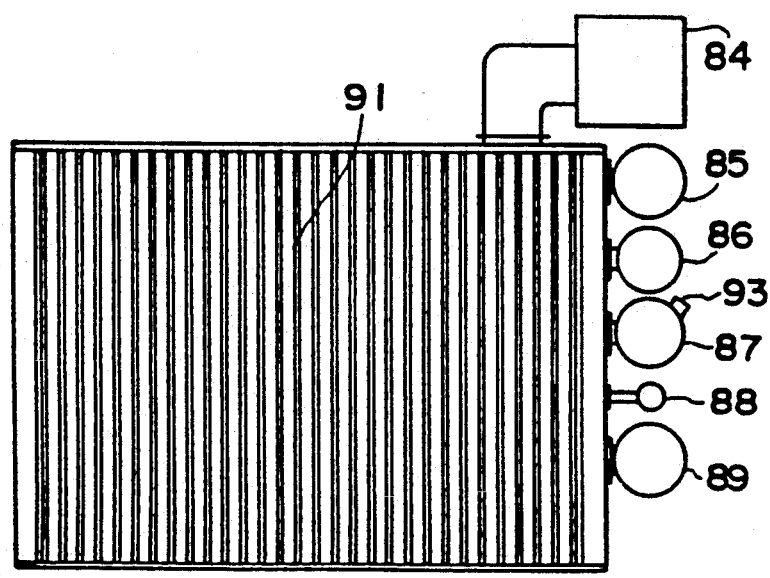
FIG. 20 is a right side view of FIG. 19.

FIG. 19 and FIG. 20 show the method of positioning several types of elements in the lateral direction, and the method of positioning in the lateral direction and stacking in the vertical direction, using elements 49 in a multiple variety by varying the width only depending on the desired capacity while aligning the height and length. In FIG. 19, for example, three types of elements having widths W1, W2, W3 are positioned in the lateral direction by one piece each, which may be properly increased or decreased depending on the desired capacity. It is also possible to stack them in the vertical direction.

Figure 14:
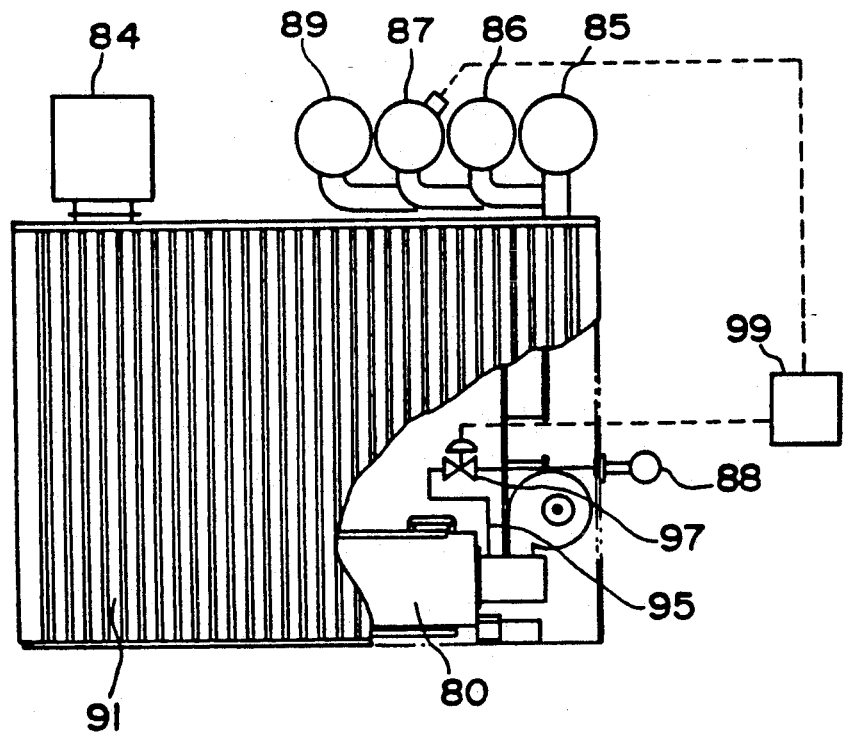
FIG. 14 is a right side view showing another example of configuration of the invention.
Figure 15:
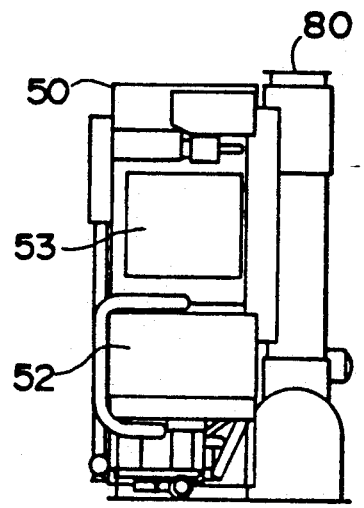
FIG. 15 is a front view showing another example of the element of the invention.
Figure 16:
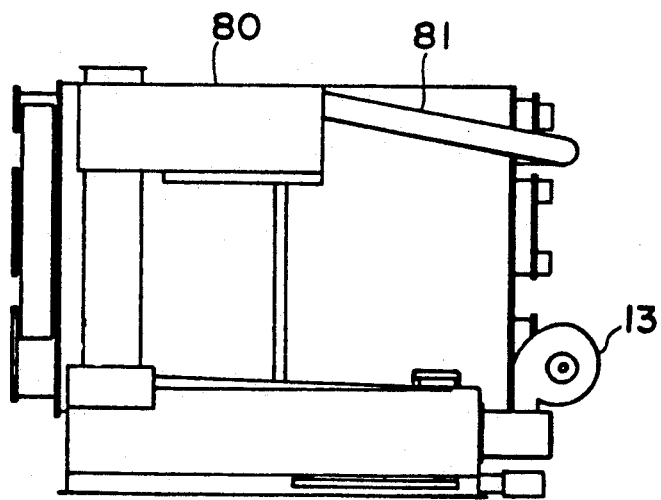
FIG. 16 is a right side view showing another example of the element of the invention.

When the elements of the invention are positioned in the lateral direction, or when positioned in the lateral direction and stacked in the vertical direction, there is no maintenance access from the side of the main body. Therefore, maintenance access is possible from the front side or rear side of the main body. In such a case, the cold and warm water inlet 86, cold and warm water outlet 87, cooling water inlet 89, cooling water outlet 85, fuel inlet 88, and exhaust gas outlet 84 are obstacles for maintenance access, and accordingly, as shown in FIG. 13, they are gathered in the rear side of the main body, and maintenance access is designed for access from the front side of the main body. Besides, as shown in FIG. 14, components 86, 87, 89, 85, 84, are also gathered on the upper surface of the main body so as to have maintenance access from the front or rear side of the main body. In this case, the front side of the element is as shown in FIG. 15, and the right side view of the element is as shown in FIG. 16. It is also recommended to enclose the entire machine installing plural elements parallel in the lateral direction, or the entire machine positioning plural elements in the lateral direction and stacking in the vertical direction, with a decorative cover (casing) 91, so as to look like one machine in appearance.

It is also preferred to attach a temperature sensor 93 to the cold and warm water outlet 87, detect the cold and warm water temperature after collecting the warm and cold water from elements by the temperature sensor 93, and composed to control the fuel amount to be supplied to elements. In FIG. 13, numeral 95 is a fuel supply pipe to each element, 97 is a fuel control valve for each element, and 99 is a controller.

Being thus composed, the invention brings about the following effects.

(1) By installing the absorber, evaporator, low temperature regenerator, and condenser in the vertical direction from the bottom in the box-shaped main body of nearly rectangular parallelepiped shape, and composing the low temperature shell with the refrigerant sump shaped for ease of flow of refrigerant vapor, the space in the main body may be effectively utilized, and the main body width may be reduced significantly, so as to be slim and lightweight. Therefore, by composing the element by forming the low temperature shell, high temperature regenerator and others into one body, a slim and compact shape is formed on the whole.

(2) Since the eliminator is disposed in the oblique direction at the side of the evaporator so that the refrigerant vapor passage may be narrower as it proceeds upwardly, so that the main body width may be much narrower than in (1).

(3) In an enclosing member is disposed in a part in the absorber so that the uncondensed gas in the absorber may be efficiently collected in one position to be purged out, an as a result the main body width may be much narrower than in (1).

(4) A flush box in double structure is disposed in order to make use of the overall length of the evaporator, and a compact sectional shape is realized, so that the main body width may be much narrower than in (1).

(5) The element for the absorption chiller/absorption chiller-heater of the invention is smaller in width, and by manufacturing elements of unit capacity, transporting as one body is possible without dividing or cutting the vacuum part as in the prior art, and it is also possible to easily effect delivery as one body into the machine room. Hence, if it is desired to increase capacity, plural elements may be laid parallel in the machine room in the lateral direction, or laid in the lateral direction and stacked in the vertical direction, and this object may be achieved easily.

(6) The absorption chiller-heater having a plurality of elements arranged in one body may be easily disassembled into elements (without cutting the vacuum part).

(7) By manufacturing basic elements, labor may be saved in production and mass production is possible. By properly considering the composition of the basic element units for the convenience of gathering and assembling, assembling work in the field may be easy. Hence, the product may be easily delivered in divisions, and a superlarge absorption chiller/absorption chiller-heater that could not be realized because it was impossible to deliver in the field in the past may be realized. Besides, the number of types of elements may be reduced, so that the reliability of the elements may be enhanced, and moreover the entire machine composed by a combination of elements, if one element experiences trouble, the operation can be continued by the remaining elements.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An element for an absorption chiller/absorption chiller-heater, comprising:
   a low temperature shell formed as a box-shaped main body having a nearly rectangular parallelepiped shape comprising:
   an absorber disposed in the bottom portion of the shell,
   an evaporator disposed in the shell at the upper side of the absorber,
   a partition plate in the shell,
   a low temperature regenerator and a condenser disposed in the shell at the upper side of the evaporator through the partition plate, and
   a refrigerant sump of nearly V or U shape disposed in the shell between the evaporator and absorber so that the refrigerant vapor evaporated in the evaporator tube may flow smoothly into the absorber; and
   at least one of a high temperature regenerator, a low temperature heat exchanger and a high temperature heat exchanger integrated adjacently with the low temperature shell.

2. An element for the absorption chiller/absorption chiller-heater, of claim 1, wherein the shell further comprises an eliminator disposed in the shell in an oblique direction at a side part of the evaporator in order to form a passage for refrigerant vapor evaporated in the evaporator tube, which passage narrows as it proceeds upwardly.

3. An element for the absorption chiller/absorption chiller-heater, of claim 2, wherein the eliminator comprises multiple slant plates, folded-back parts bent upward, communicating with the upper end of the slant plates, and straightening parts curved downward, communicating with the upper end of the slant plates.

4. An element for the absorption chiller/absorption chiller-heater, of claim 1, wherein the shell further comprises an enclosing member disposed in the shell with an upper end of the enclosing member closed and disposed in a part in the absorber in order to collect the uncondensed gas in the absorber in one position, a space of lower pressure, and a purge pipe is connected in said space.

5. An element for the absorption chiller/absorption chiller-heater, of claim 1, wherein the shell further comprises a flush box having an inner tube and an outer box with multiple tiny holes extending in the longitudinal direction of the inner tube and outer box and notches extending in the outer box, said flush box being disposed between the evaporator and refrigerant sump over the entire length of the evaporator, and wherein condensed liquid refrigerant is passed in the inner tube, and a flush chamber is formed between the outer box and inner tube.

6. An absorption chiller/absorption chiller-heater comprising a plurality of elements of claim 1, said elements being disposed parallel in the lateral direction.

7. An absorption chiller/absorption chiller-heater comprising a plurality of elements of claim 1, said elements being disposed parallel in the lateral direction and stacked in the vertical direction.

8. An absorption chiller/absorption chiller-heater comprising a plurality of elements of claim 1, said elements being disposed by aligning the height and length, and varying only the width depending on the capacity.

9. An absorption chiller/absorption chiller-heater comprising a plurality of elements of claim 1, a cold and warm water inlet, a cold and warm water outlet, a cooling water inlet, and a cooling water outlet located at the rear side of the main body of each element.

10. An absorption chiller/absorption chiller-heater comprising a plurality of elements of claim 1, a cold and warm water inlet, a cold and warm water outlet, a cooling water inlet, and a cooling water outlet located at the upper side of the main body of each element.

11. An absorption chiller/absorption chiller-heater comprising a plurality of elements of claim 1, wherein the plurality of elements are entirely covered with a decorative cover.

12. An absorption chiller/absorption chiller-heater comprising a plurality of elements of claim 1, a cold and warm water outlet, and a temperature sensor attached to the cold and warm water outlet to detect the temperature of cold and warm water after collecting the cold and warm water from said elements, thereby controlling the fuel amount to be supplied to said elements.

13. An element for the absorption chiller/absorption chiller-heater, of claim 2, wherein the shell further comprising an enclosing member disposed in the shell with an upper end of the enclosing member closed and disposed in a part in the absorber in order to collect the uncondensed gas in the absorber in one position, a space of lower pressure, and a purge pipe connected in said space.

14. An element for the absorption chiller/absorption chiller-heater, of claim 3, wherein the shell further comprising an enclosing member disposed in the shell with an upper end of the enclosing member closed and disposed in a part in the absorber in order to collect the uncondensed gas in the absorber in one position, a space of lower pressure, and a purge pipe connected in said space.

15. An element for the absorption chiller/absorption chiller-heater, of claim 2, wherein the shell further comprises a flush box having an inner tube and an outer box with multiple tiny holes extending in the longitudinal direction of the inner tube and outer box and notches extending in the outer box, said flush box being disposed between the evaporator and refrigerant sump over the entire length of the evaporator, and wherein condensed liquid refrigerant is passed in the inner tube, and a flush chamber is formed between the outer box and inner tube.

16. An element for the absorption chiller/absorption chiller-heater, of claim 3, wherein the shell further comprises a flush box having an inner tube and an outer box with multiple tiny holes extending in the longitudinal direction of the inner tube and outer box and notches extending in the outer box, said flush box being disposed between the evaporator and refrigerant sump over the entire length of the evaporator, and wherein condensed liquid refrigerant is passed in the inner tube, and a flush chamber is formed between the outer box and inner tube.

17. An absorption chiller/absorption chiller-heater comprising a plurality of elements of claim 2, said elements being disposed parallel in the lateral direction.

18. An absorption chiller/absorption chiller-heater comprising a plurality of elements claim 3, said elements being disposed parallel in the lateral direction.

19. An absorption chiller/absorption chiller-heater comprising a plurality of elements of claim 2, said elements being disposed parallel in the lateral direction and stacked in the vertical direction.

20. An absorption chiller/absorption chiller-heater comprising a plurality of elements of claim 3, said elements being disposed parallel in the lateral direction and stacked in the vertical direction.

21. An absorption chiller/absorption chiller-heater comprising a plurality of elements of claim 2, said elements for being disposed by aligning the height and length, and varying only the width depending on the capacity.

22. An absorption chiller/absorption chiller-heater comprising a plurality of elements of claim 3, said elements being disposed by aligning the height and length, and varying only the width depending on the capacity.

23. An absorption chiller/absorption chiller-heater comprising a plurality of elements of claim 2, a cold and warm water inlet, a cold and warm water outlet, a cooling water inlet, and a cooling water outlet located at the rear side of the main body of each element.

24. An absorption chiller/absorption chiller-heater comprising a plurality of elements of claim 3, a cold and warm water inlet, a cold and warm water outlet, a cooling water inlet, and a cooling water outlet located at the rear side of the main body of each element.

25. An absorption chiller/absorption chiller-heater comprising a plurality of elements of claim 2, a cold and warm water inlet, a cold and warm water outlet, a cooling water inlet, and a cooling water outlet located at the upper side of the main body of each element.

26. An absorption chiller/absorption chiller-heater comprising a plurality of elements of claim 3, wherein a cold and warm water inlet, a cold and warm water outlet, a cooling water inlet, and a cooling water outlet located at the upper side of the main body of each element.

27. An absorption chiller/absorption chiller-heater comprising a plurality of elements of claim 2, wherein the plurality of elements are entirely covered with a decorative cover.

28. An absorption chiller/absorption chiller-heater comprising a plurality of elements of claim 3, wherein the plurality of elements are entirely covered with a decorative cover.

29. An absorption chiller/absorption chiller-heater comprising a plurality of elements of claim 2, a cold and warm water outlet, and a temperature sensor attached to the cold and warm water outlet to detect the temperature of cold and warm water after collecting the cold and warm water from said elements, thereby controlling the fuel amount to be supplied to said elements.

30. An absorption chiller/absorption chiller-heater comprising a plurality of elements of claim 3, a cold and warm water outlet, and a temperature sensor attached to the cold and warm water outlet to detect the temperature of cold and warm water after collecting the cold and warm water from said elements, thereby controlling the fuel amount to be supplied to said elements.

* * * * *

UNITED STATES PATENT AND TRADEMARK OFFICE
CERTIFICATE OF CORRECTION

PATENT NO. : 5,259,205

DATED : November 9, 1993

INVENTOR(S) : Shuzo Takahata et al

It is certified that error appears in the above-identified patent and that said Letters Patent is hereby corrected as shown below:

Claim 4, column 10, line 35, "is" should be deleted.

Claim 13, column 11, line 14, "prising" should be --prises--.

Claim 14, column 11, line 23, "prising" should be --prises--.

Claim 21, column 12, line 9, "for" should be deleted.

Signed and Sealed this

Fourteenth Day of June, 1994

*Attest:*

BRUCE LEHMAN

*Attesting Officer*     *Commissioner of Patents and Trademarks*